Jan. 28, 1936.  F. J. GOFF  2,028,976
WHEELED VEHICLE
Original Filed June 1, 1932
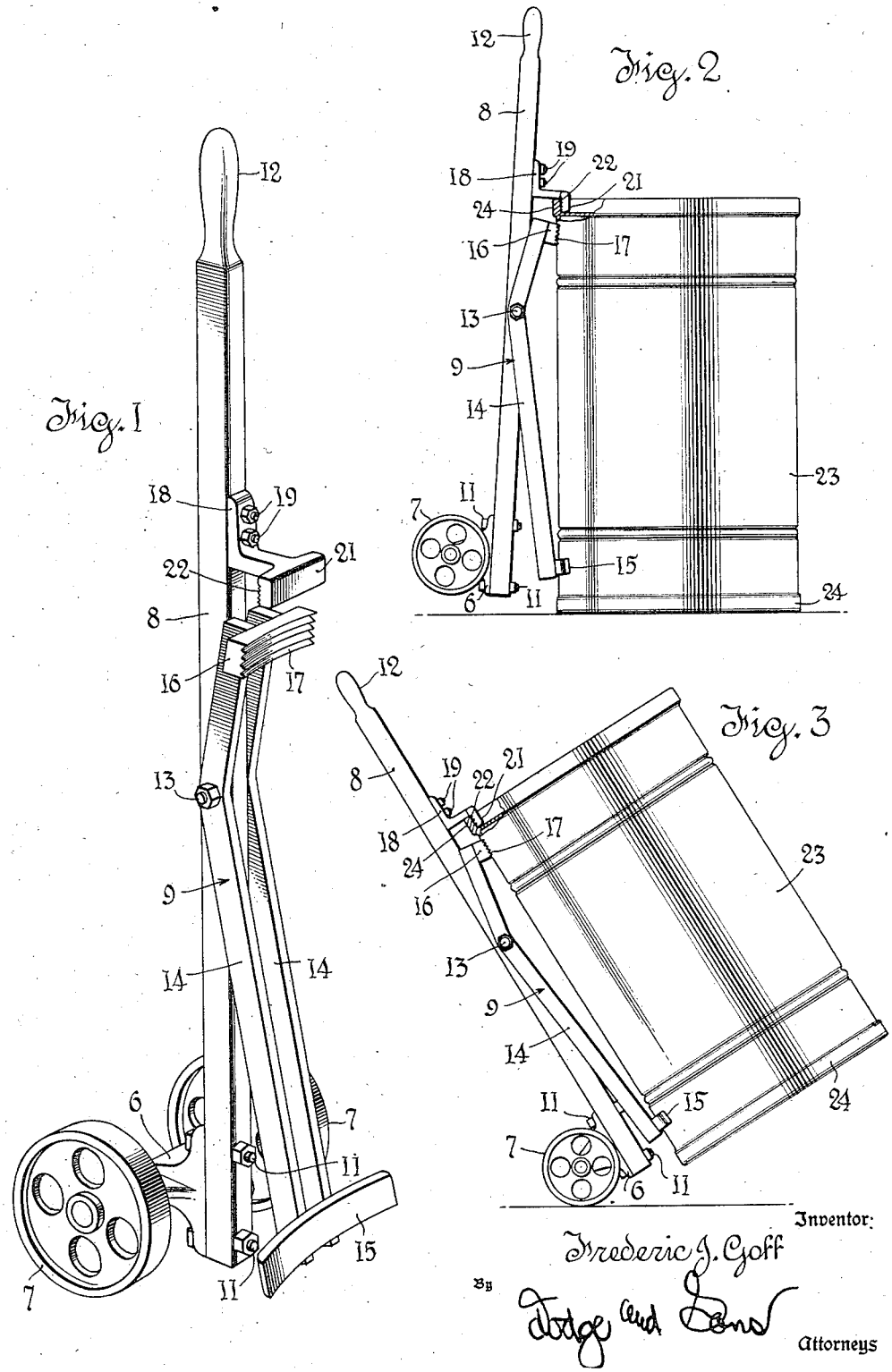

Patented Jan. 28, 1936

2,028,976

UNITED STATES PATENT OFFICE 2,028,976

WHEELED VEHICLE

Frederic J. Goff, Madison, Wis., assignor to William J. Eskra, Milwaukee, and Nathaniel G. Goff, Madison, Wis., partners Application June 1, 1932, Serial No. 614,814
Renewed October 25, 1935

6 Claims. (Cl. 280—53)

My invention relates to wheeled vehicles, and particularly to small portable vehicles or trucks adapted for one-man manipulation.

Among the objects of the invention are included the provision of a simple portable vehicle capable of transporting heavy oil drums, barrels and the like, and requiring the services of one man only; a vehicle which can be readily loaded and unloaded; a vehicle which positively clamps the load in place without any movements other than those necessary in the normal steps of loading, transporting and unloading; and a vehicle which has no loose parts requiring positioning or adjustment.

Various other objects of the invention will be evident from a reading of the following specification, in connection with the accompanying drawing, in which:—

Fig. 1 is a perspective view of one form of vehicle embodying my invention;

Fig. 2 is an elevation showing the manner of loading the vehicle, and the position of the parts during the loading operation; and Fig. 3 is an elevation showing the vehicle loaded, and the parts in the positions they occupy in carrying a load.

The wheeled vehicle shown in the drawing as a two-wheeled truck, comprises a body 6 supported on wheels 7, a handle 8, and a cradle 9 pivoted on said handle. The body 6, made of steel, cast-iron or other suitable material, supports a single shaft or a pair of stub shafts, on which the wheels 7 are mounted. Attached to the body 6, as by bolts 11, is the handle 8 forming the backbone and main supporting member of the truck. This handle may be of any suitable cross section, except at the top end, where it is shaped as at 12 to provide a hand-hold.

Pivotally mounted on the handle 8, at 13, is a cradle 9 comprising a pair of parallel side bars 14 secured together at their lower ends by a curved shoe or plate 15, adapted to rest against the load and preferably to conform to its contour. The shoe 15 is rigidly attached to the side pieces 14 in any suitable manner, as by welding. At their top ends, these side bars 14 are secured in rigid fixed relation by a jaw 16, welded or otherwise rigidly secured to them and having a curved serrated front face 17 adapted to engage the load carried by the truck. The serrations are provided to secure a more firm hold on the article to be carried.

The two side bars 14 on opposite sides of the pivot 13, as here shown, are angularly related so as to result in the formation of a long lever arm below the pivot 13, and a short lever arm above it, the two arms being disposed at an angle somewhat less than 180° from the side carrying the shoe 15 and jaw 16. Obviously, the same result may be obtained by curving the bars 14.

Attached to the handle 8 as by bolts 19 at a point above the jaw 16 carried by cradle 9, is a bracket 18. This bracket extends at right angles to the handle 8, and terminates in a downwardly depending jaw 21 having a serrated inner face 22, adapted to contact with and grip an article to be carried and to cooperate with the jaw 16 in doing so. These two jaws function in consonance to grip from opposite sides the article to be carried, and to clamp it securely to the truck during transporting operations, without requiring the bottom of the article to be supported in any way.

For the purpose of this description, the truck is referred to as being used in lifting and transporting heavy steel drums, such as those which are frequently used in storing oil. It will be understood, however, that the use is not limited to this particular field, since the truck is capable of carrying barrels, sacks, and any other articles which can be gripped by the jaws 16 and 21 to prevent them from sliding downwardly during transportation.

The method of operating the truck will be understood from a reference to Figs. 2 and 3 of the drawing, wherein the reference character 23 designates a steel barrel or oil drum having the usual chimes or rims 24 at its ends. When it is desired to move the drum 23 from one place to another, the truck is lifted and the jaw 21 hooked over the chime 24 at the top of the barrel. The weight of the depending truck will cause it to swing inwardly toward the barrel until the shoe 15 engages the side of the barrel, and the jaw 16 contacts with the outer face of the barrel below the top chime 24.

The operator then seizes the handle and pulls it backwardly away from the barrel, while holding his foot against the body 6 of the truck. In this way, a powerful leverage can be exerted upon the barrel, causing it to tip over until the wheels 7 contact with the surface upon which the barrel rests.

As this tilting operation proceeds, the weight of the barrel is gradually brought against the shoe 15, and the side bars 14 of the cradle, thereby rocking this cradle and bringing the shoe 15 into more firm contact with the wall of the barrel. At the same time, the action results in producing a firmer contact between the serrated face 22 of jaw 21 and the inside of chime 24. When the barrel has been lifted, as shown in Fig. 3, the chime 24 is firmly clamped between the serrated faces 17 and 22 of the jaws 16 and 21, and is prevented from sliding off the truck. The tilting may be stopped when the lower end of the barrel is raised sufficiently from the ground to permit the truck to be rolled along, carrying its load.

When the place of deposit is reached, the operator places his foot on the truck body 6 and allows the barrel to swing forwardly, and eases it down until the parts are returned to the position shown in Fig. 2. The truck may then be lifted off the barrel, since the clamping action between jaws 16 and 21 ceases as soon as the weight of the load is removed from the cradle.

As shown, the jaw 21 is spaced from the lower end of handle 8 by an amount corresponding substantially to the height of the drum or barrel to be lifted. It will be obvious, however, that the jaw 21 need not be located at exactly this point, since the truck is capable of handling taller objects. The only limitation is that the jaw 21 must be located far enough down to permit it to hook over the shortest object to be handled. Inasmuch as objects of the character under consideration are more or less standard in size and form, the best proportioning of parts can be initially chosen so that further modifications are unnecessary, and all adjustments and superfluous parts are completely done away with. The vehicle illustrated has two wheels, but it will be understood that my invention is not limited to the use of this particular number.

It will be obvious from the above description that the truck herein shown and described can be manipulated by one man, and there is no necessity for lifting the load as a dead-weight, since there is nothing to be inserted under the load. The parts of the truck are so arranged as to make it possible to exert a powerful leverage, and to transport with ease articles having a weight of from 400 to 500 pounds or more. Drums of the character herein shown are ordinarily difficult and cumbersome to handle, both because of their size and weight, and also because of the absence of any suitable gripping means. By the use of this truck, the necessity of lifting, tipping and rolling drums of this character is entirely avoided, and one man can do the work formerly requiring two men.

Although I have herein shown and described only one form of truck embodying this invention, it will be obvious that various changes and modifications may be made in the details within the scope of the appended claims, without departing from the spirit and scope of the invention.

What is claimed is:

1. A vehicle comprising a frame constructed for rolling movement and including an elongated supporting member; a stationary clamping jaw carried by said member adjacent the upper end thereof; and a pivoted member on said supporting member, said pivoted member being adapted to support an article to be carried and against which said article reacts at a point remote from said stationary clamping jaw and adjacent the lower end of said supporting member, said pivoted member including a movable jaw cooperating with said stationary jaw to clamp an article on said pivoted member.

2. A vehicle comprising a body constructed for rolling movement; an elongated member secured to said body; an article-supporting member pivoted on said elongated member; a shoe on one end of said article-supporting member; a clamping jaw on the other end of said article-supporting member; and a stationary clamping jaw carried by said elongated member and cooperating with the stationary jaw on said elongated member, to clamp an article in position on said body.

3. The combination with an elongated body constructed for rolling movement, of an article-supporting cradle pivoted on said body in longitudinal alignment with said body; an article-engaging shoe on one end of said cradle and a movable clamping jaw on the other end; and a stationary jaw on said body cooperating with said movable jaw to clamp an article in position on said body.

4. The combination with a wheeled body, of an elongated member; a first class lever pivoted on said member and comprising a long arm below the pivot point and a shorter arm above the pivot point; a clamping jaw on said shorter arm above the pivot point; a second clamping jaw mounted on said elongated member for cooperation with said first-named jaw; and an article-engaging shoe carried by the long arm of said lever at a point remote from said pivot point.

5. The combination with a frame constructed for rolling movement, of a stationary clamping jaw mounted thereon and having an article-engaging face spaced from said frame; a movable jaw located inwardly of said stationary jaw and adapted to cooperate therewith; and a lever for actuating said movable jaw, said lever being pivoted on said frame and constructed to support an article.

6. In a machine for transporting barrel-like articles, the combination of a rigid body element; a jaw secured in spaced relation thereto and extending downwardly in substantial parallelism therewith; and a lever of the first order fulcrumed on the body, said lever at its upper end being provided with a jaw standing below that of the first named jaw, and said lever at its lower end carrying a shoe.

FREDERIC J. GOFF.